(12) United States Patent
Campini et al.

(10) Patent No.: US 7,539,184 B2
(45) Date of Patent: May 26, 2009

(54) RECONFIGURABLE INTERCONNECT/SWITCH FOR SELECTABLY COUPLING NETWORK DEVICES, MEDIA, AND SWITCH FABRIC

(75) Inventors: Edoardo Campini, Mesa, AZ (US);
Douglas Lee Stahl, Phoenix, AZ (US);
David R. Formisano, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 804 days.

(21) Appl. No.: 11/027,344

(22) Filed: Dec. 30, 2004

(65) Prior Publication Data

US 2006/0146808 A1 Jul. 6, 2006

(51) Int. Cl.
*H04L 12/50* (2006.01)

(52) U.S. Cl. .......................... 370/388; 370/389; 716/12

(58) Field of Classification Search ........................ None
See application file for complete search history.

(56) References Cited

U.S. PATENT DOCUMENTS 5,857,087 A * 1/1999 Bemanian et al. .......... 710/305
2003/0101426 A1* 5/2003 Sarkinen et al. ............... 716/12

OTHER PUBLICATIONS

Palkert, T., "OIF-48, OC-192 & OC-768 Electrical Interfaces", Optical Internetworking Forum, pp. 1-15, www.oiforum.com, last accessed Jul. 28, 2008.
Fulcrum Microsystems, "Pivot Point FM 1010 Six-interface SPI-4.2 Switch chip", www.fulcimmicro.com, Dec. 10, 2004, pp. 1-6.

* cited by examiner

*Primary Examiner*—Robert W Wilson
(74) *Attorney, Agent, or Firm*—Blakely, Sokoloff, Taylor & Zafman LLP

(57) ABSTRACT

A reconfigurable interconnect/switch for selectably coupling network devices, media, and switch fabric. The reconfigurable interconnect/switch enables network devices, such as network processor units (NPUs) to selectively communicate with other NPUs, media (via a media interface), and switch fabric (via a switch fabric interface), thus providing flexibility in the use of network line cards and the like. Embodiments of the switching/routing scheme may be employed to support network devices having separate media and/or switch fabric interfaces, as well as network devices having selectable media switch fabric (MSF) interfaces that share signal lines.

7 Claims, 12 Drawing Sheets

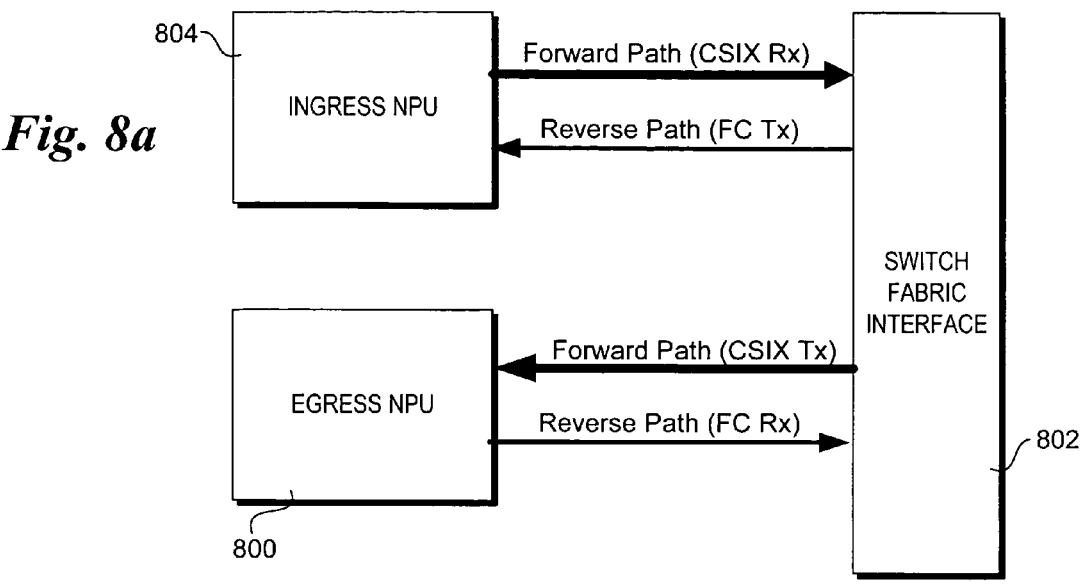
*Simplex Configuration*
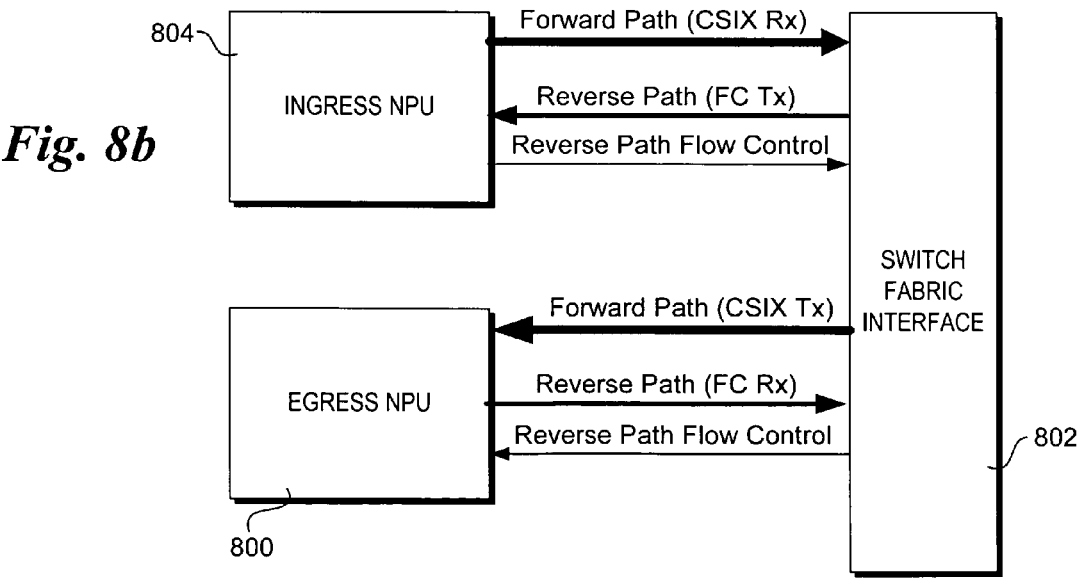
*Hybrid Simplex Configuration*

*Full Duplex Configuration*

RECONFIGURABLE INTERCONNECT/SWITCH FOR SELECTABLY COUPLING NETWORK DEVICES, MEDIA, AND SWITCH FABRIC

FIELD OF THE INVENTION

The field of invention relates generally to computer and telecommunications networks and, more specifically but not exclusively relates to a reconfigurable interconnect/switch for selectively coupling network devices, media, and switch fabric.

BACKGROUND INFORMATION

Network elements, such as switches and routers, are designed to forward network traffic, in the form of packets, at high line rates. One of the most important considerations for handling network traffic is packet throughput. To accomplish this, special-purpose processors known as network processors have been developed to efficiently process very large numbers of packets per second. In order to process a packet, the network processor (and/or network equipment employing the network processor) needs to extract data from the packet header indicating the destination of the packet, class of service, etc., store the payload data in memory, perform packet classification and queuing operations, determine the next hop for the packet, select an appropriate network port via which to forward the packet, etc. These operations are generally referred to as "packet processing" operations.

Modern network processors (also commonly referred to as network processor units (NPUs) perform packet processing using multiple multi-threaded processing elements (e.g., processing cores) (referred to as microengines or compute engines in network processors manufactured by Intel® Corporation, Santa Clara, Calif.), wherein each thread performs a specific task or set of tasks in a pipelined architecture. During packet processing, numerous accesses are performed to move data between various shared resources coupled to and/or provided by a network processor. For example, network processors commonly store packet metadata and the like in static random access memory (SRAM) stores, while storing packets (or packet payload data) in dynamic random access memory (DRAM)-based stores. In addition, a network processor may be coupled to cryptographic processors, hash units, general-purpose processors, and expansion buses, such as the PCI (peripheral component interconnect) and PCI Express bus.

Network processors are often configured to perform processing in a collaborative manner, such as via a pipeline processing scheme. For instance, some modern network line cards employ multiple network processors that are employed for performing a specific set of tasks, such as ingress and egress operations. In addition, some network processors, such as the Intel® IXP28xx series NPU, provide a single media and switch fabric (MSF) interface, which may be selectively configured to support either a System Packet Interface (SPI)-based interface or a Common Switch Interface (CSIX)-based interface in each of the transmit (Tx) and receive (Rx) directions. Under a conventional approach, multiple network processors of this type and/or other line card devices are connected via "fixed" interfaces, thus limiting the flexibility of the line card usage.

In further detail, FIG. 1 shows a line card architecture 100 including an input/output (I/O) block 102 including transceivers (XCVRs) 0-N coupled to a media interface (I/F) 104, NPUs 106, 108, 110, and 112, and a switching fabric interface 114. Each of NPUs 106, 108, 110, and 112 provide only a single media and switch fabric (MSF) interface having transmit and receive interfaces that may be configured a both media interfaces, switching fabric interfaces, or a mixed mode wherein one interface is used for media, while the other is used for the switch fabric. Under a conventional approach, the MSF interfaces are statically configured, and NPUs 106, 108, 110 and 112 are connected via fixed interfaces 116, 118, 120, 122, 124, and 126 in a daisy-chain configuration. This approach also requires some of the devices to function as pass-through devices, consuming a portion of the available bandwidth for those devices. For example, if NPU 106 desires to send traffic to the system's fabric via fabric interface 114, the traffic must first pass through NPU 118. This is inefficient. In addition, if one of the network devices fails, the entire daisy-chain is broken, resulting in a system with a single fail point.

Under the foregoing conventional approach, the line card is typically tailored to perform a particular set of applications. While this may apply to certain uses, it may not meet the functionality and/or throughput requirements of future uses. Accordingly, it would be advantageous to provide a flexible architecture that would enable the interfaces between various network line card devices to be reconfigured, thus providing a platform that can meet both present and future needs.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein like reference numerals refer to like parts throughout the various views unless otherwise specified:

FIG. 8a is a schematic diagram illustrating a simplex scheme for employing flow control using an ingress and egress NPU under the CSIX-L1 interface; and FIG. 8b is a schematic diagram illustrating a hybrid simplex scheme for employing flow control using an ingress and egress NPU under the CSIX-L1 interface;

DETAILED DESCRIPTION

Embodiments of methods and apparatus to support reconfigurable line card configurations and the like are described herein. In the following description, numerous specific details are set forth, such as implementations using Intel's® IXP28xx series NPUs, to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In accordance with aspects of the embodiments disclosed herein, techniques are provided that enable network element (e.g., switches, routers, etc.) components, such as line cards and the like, to be reconfigured to meet various requirements and applications. In particular, the techniques enable signal path routes between interfaces for network devices, such as but not limited to NPUs, framers, slow path processors, general-purpose processors, state machines, etc., to be reconfigured via a programmable interface, thus enabling a single line card platform to support a variety of architecture configurations.

Figure 1:
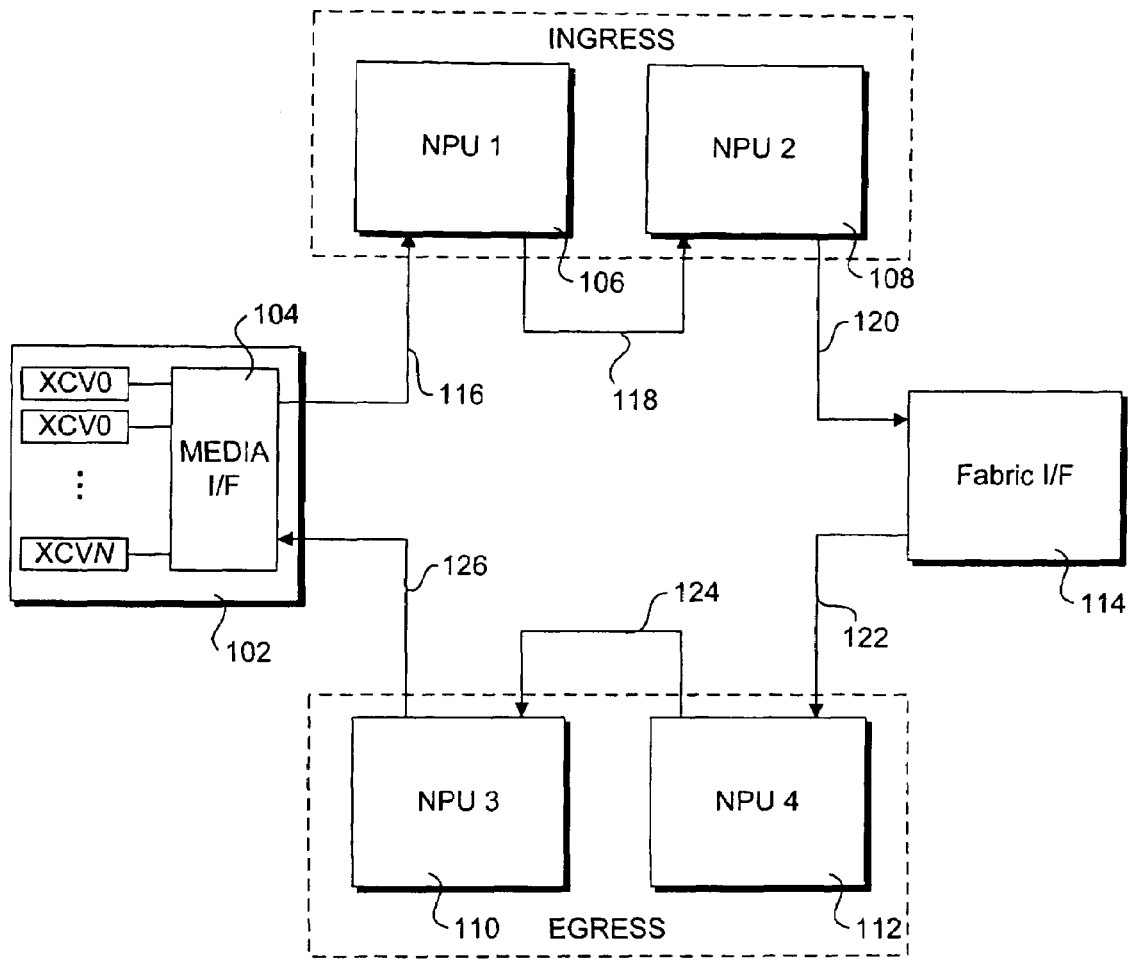
FIG. 1 is a schematic block diagram of a conventional fixed signal routing scheme between network devices and media and switch fabric interfaces on a line card.
Figure 2:
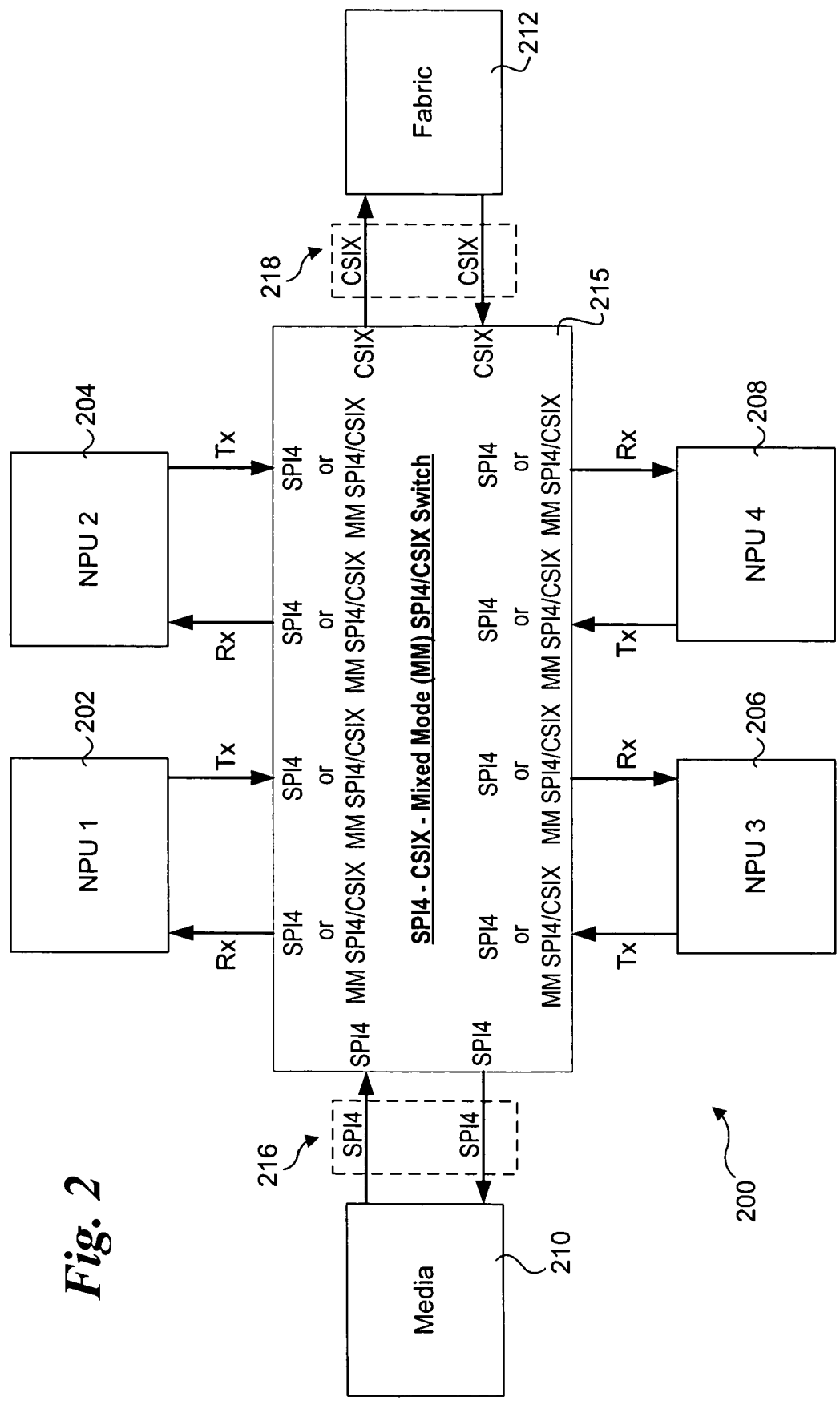
FIG. 2 is a schematic block diagram illustrating a routing scheme according to one embodiment of the invention that enables signals from a given network device to be selectively routed to another network device, media interface, or switch fabric interface via a reconfigurable mixed mode switch fabric interconnect and media switch.

As an overview, reference is made to FIG. 2, which depicts an exemplary flexible line card architecture 200 including four NPUs 202, 204, 206, 208. Each of the NPUs is selectively coupleable to the other NPUs, as well as to media 210 and fabric 212 via an SPI4—CSIX—Mixed Mode (MM) SPI4/CSIX switch 214. More specifically, each of NPUs 202, 204, 206 and 208, and 206, includes a pair of programmable transmit and receive MSF interfaces, each of which may be programmed to operate as a SPI-4—(System Packet Interface, Level 4) based interface or a CSIX-based interface. Meanwhile, SPI4—CSIX—MM SPI4/CSIX switch 214 may be programmed to interconnect SPI4-based and CSIX-based transmit and receive interfaces between NPUs 202, 204, 206, and 208, while routing signals to and from an SPI4-based interface 216 to media 210, and a CSIX-based interface 218 to fabric 212. In one embodiment, the SPI4-based interfaces comprise SPI-4.2 (System Packet Interface, Level 4, Phase 2) interfaces. In one embodiment, the CSIX-based interfaces comprise CSIX-L1 (Common Switch Interface, Level 1) interfaces.

Figure 3:
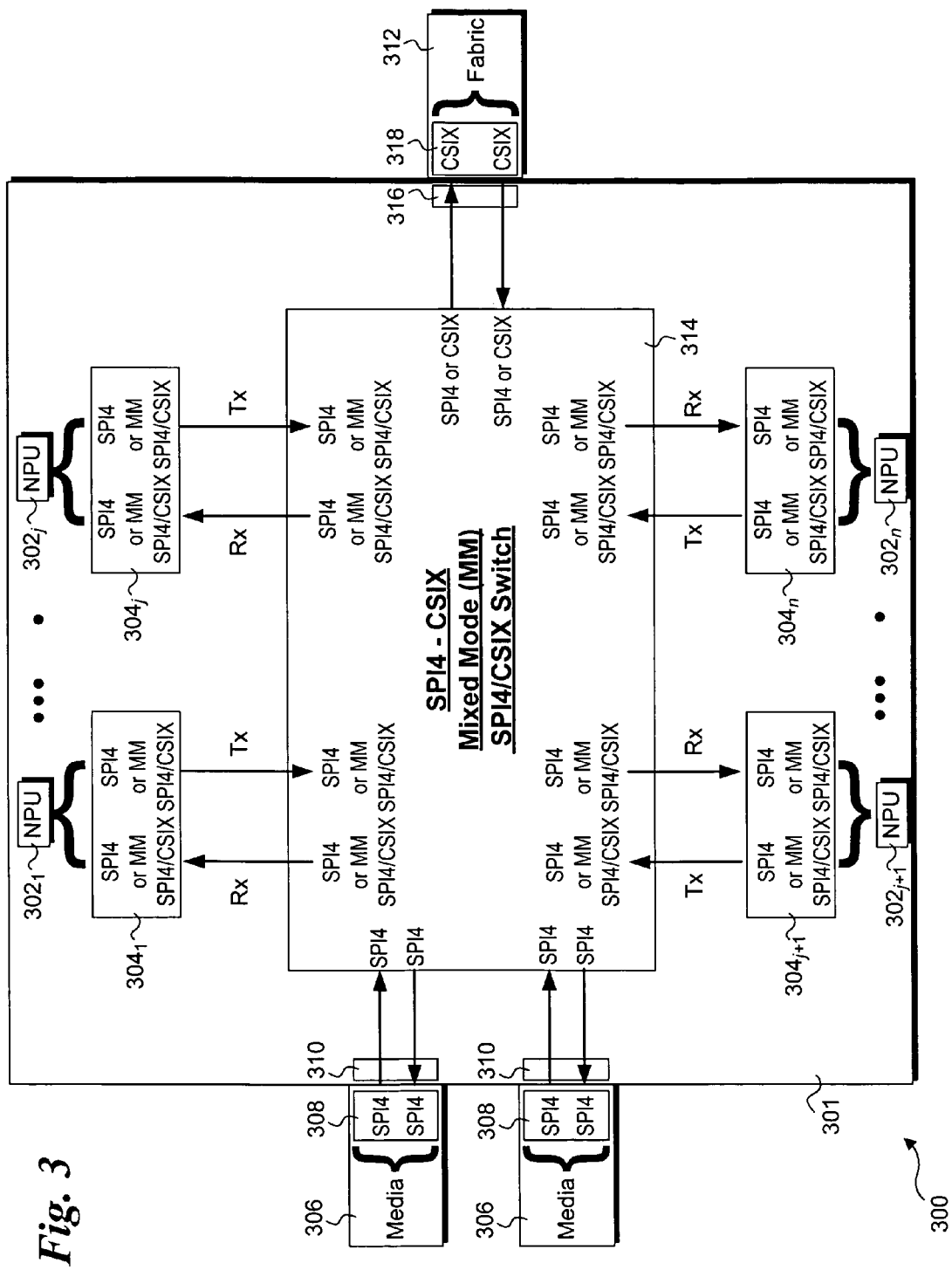
FIG. 3 is a schematic block diagram illustrating an implementation of the reconfigurable mixed mode switch fabric interconnect and media switch on a network line card, according to one embodiment of the invention.

FIG. 3 shows a scalable line card architecture 300 employing a scalable SPI4—CSIX—MM SPI4/CSIX switch 314 that operates in a manner similar to SPI4—CSIX—MM SPI4/CSIX switch 214 of FIG. 2. Scalable line card architecture 300 includes a line card 301 hosting n NPUs $302_{1-n}$, each having a programmable MSF interface $304_{1-n}$, that is capable of providing an SPI4- or CSIX-based interface for each of the receive and transmit directions. The scalable SPI4—CSIX—MM SPI4/CSIX switch 314 also includes one or more SPI4-based transmit/receive interfaces (two shown in FIG. 3) to communicate with respective SPI4-based interfaces provided by one or more appropriate media I/O devices, such as one or more other line cards 306. SPI-4-based signals are coupled between line card 301 and media I/O devices 306 via respective SPI-4 interfaces 308 and connectors 310.

Scalable line card architecture 300 also includes provisions for communicating with a switch fabric 312 hosted by the network element in which line card 301 is installed. This is supported by a connector 316 and CSIX transmit and receive interfaces that interact with a CSIX interface component 318, such as a fabric interface chip (FIC). In general, the FIC may be hosted by line card 301, or may be on another line card hosting all or a portion of fabric 312.

Figure 4:
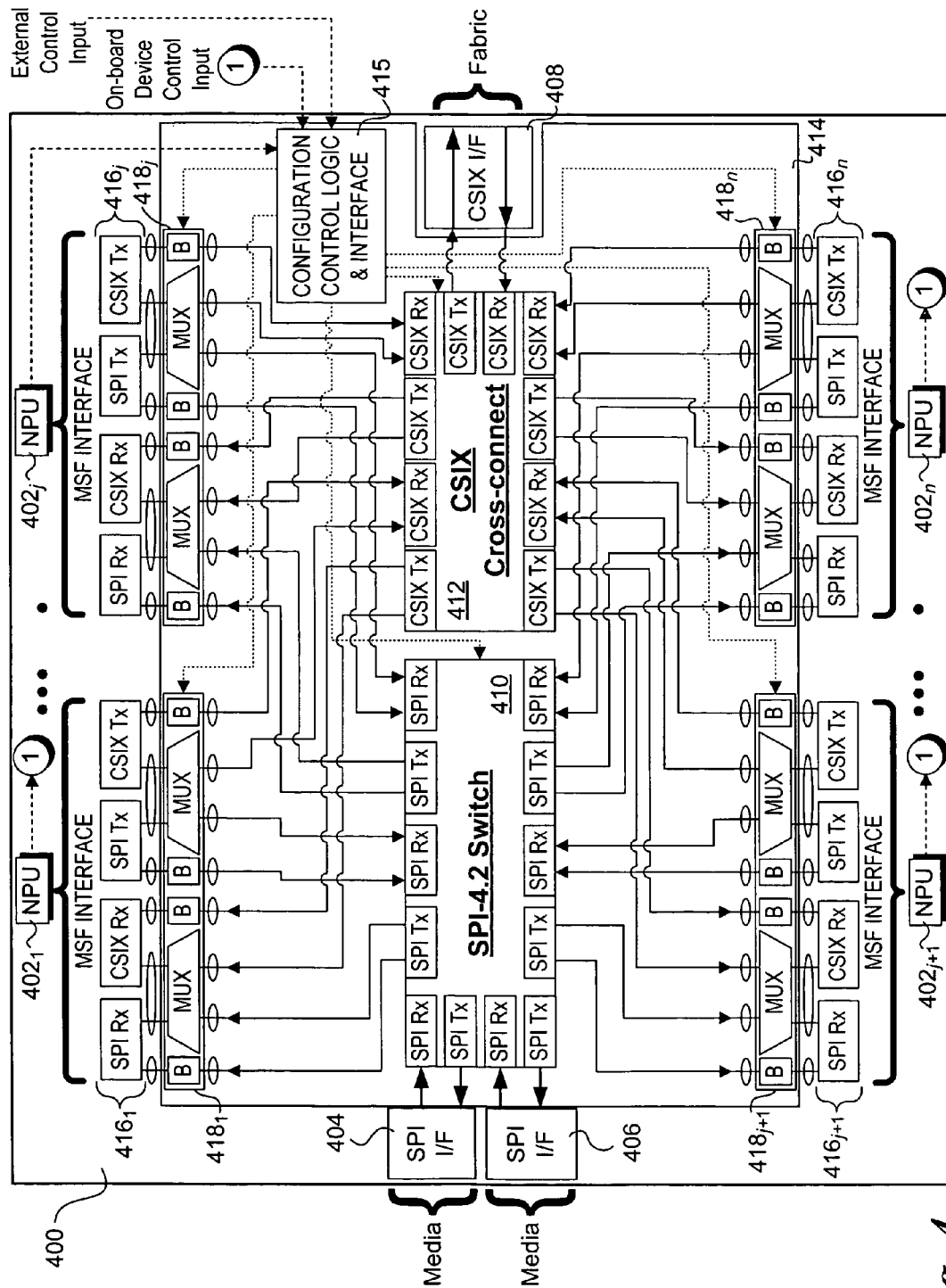
FIG. 4 is a schematic diagram illustrating further details of an implementation of the reconfigurable mixed mode switch fabric interconnect and media switch on a network line card, wherein the media signals use an SPI-4.2 interface, and the switch fabric employs a CSIX interface.

FIG. 4 shows further detail of one embodiment of a scalable SPI4—CSIX—MM SPI4/CSIX switch embodied as a reconfigurable CSIX interconnect/SPI4 switch 414. The reconfigurable CSIX interconnect/SPI switch 414 provides reconfigurable connections between selectable CSIX-based ports and interfaces, while providing switch-based connections between selectable SPI-based ports and interfaces.

In further detail, FIG. 4 depicts a line card 400 including n NPUs 4021-n, reconfigurable CSIX interconnect/SPI switch 414, SPI-based interfaces 404 and 406, and a CSIX-based interface 408. Reconfigurable CSIX interconnect/SPI switch 414 includes an SPI-4.2 switch 410, a CSIX cross-connect 412, and a configuration control logic and interface 415. In one embodiment, each of NPUs 4021-n comprises an Intel IXP28xx series NPU, for example, an Intel IXP2800 or IXP2850 NPU. Each of the Intel IXP28xx NPU architectures includes a MSF interface 4161-n that may be programmed to selectively connect the NPU to a physical layer device (PHY) and/or a Switch Fabric Interface. The MSF interface includes the following external interfaces:

1) Receive and transmit interfaces, each of which can be individually configured for either SPI-4.2 to a PHY device or the CSIX-L1 protocol to a switch fabric.

2) A Flow Control Interface, which provides a point-to-point connection used primarily to pass CSIX-L1 flow control C-Frames either between two NPUs or between an NPU and a switch fabric, as described below in further detail with reference to FIGS. 8a-c.

Figure 5A:
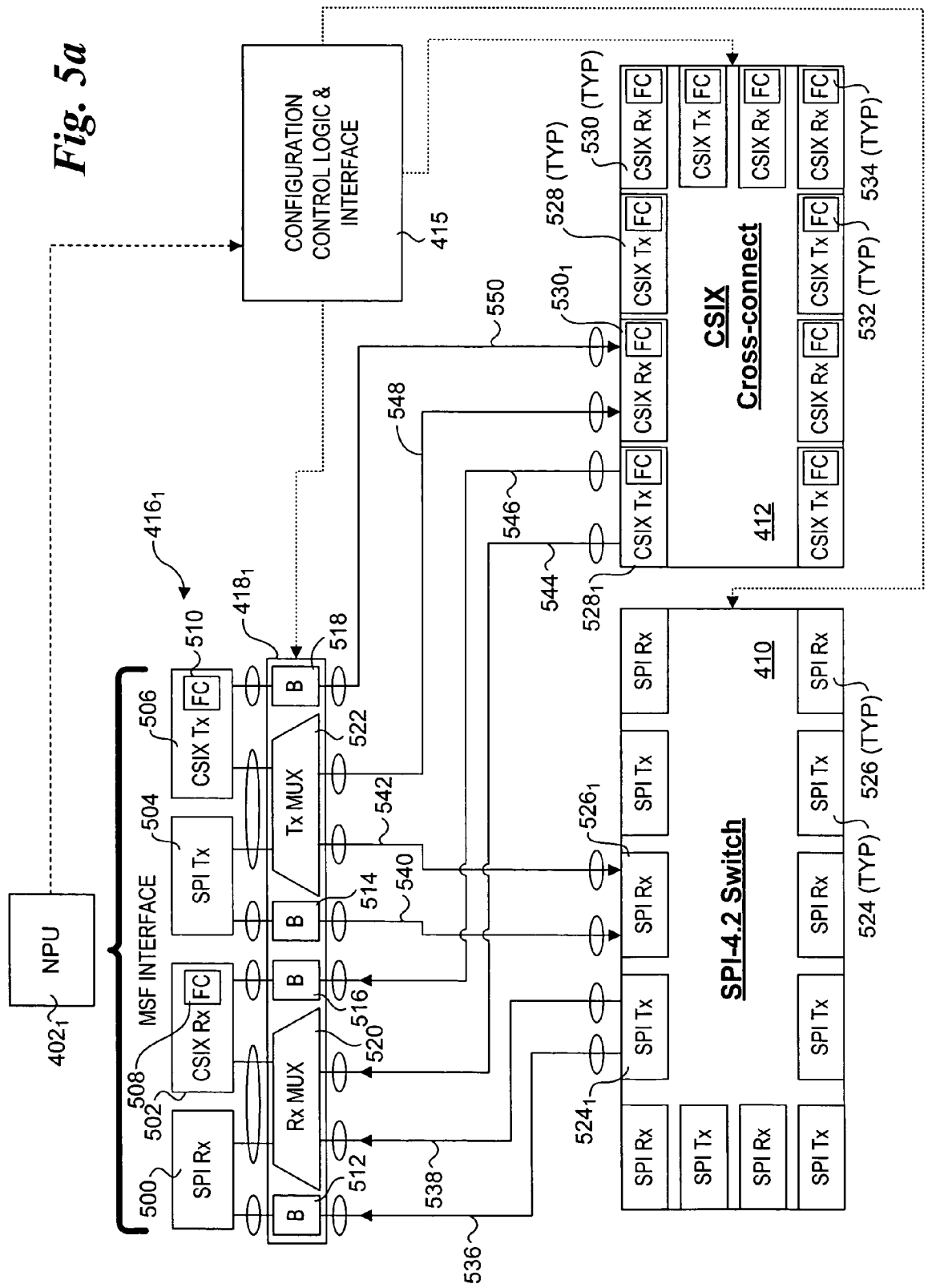
FIG. 5a is a schematic diagram illustrating further details of the components of the reconfigurable mixed mode switch fabric interconnect and media switch and the routing of signal lines between the components.
Figure 5B:
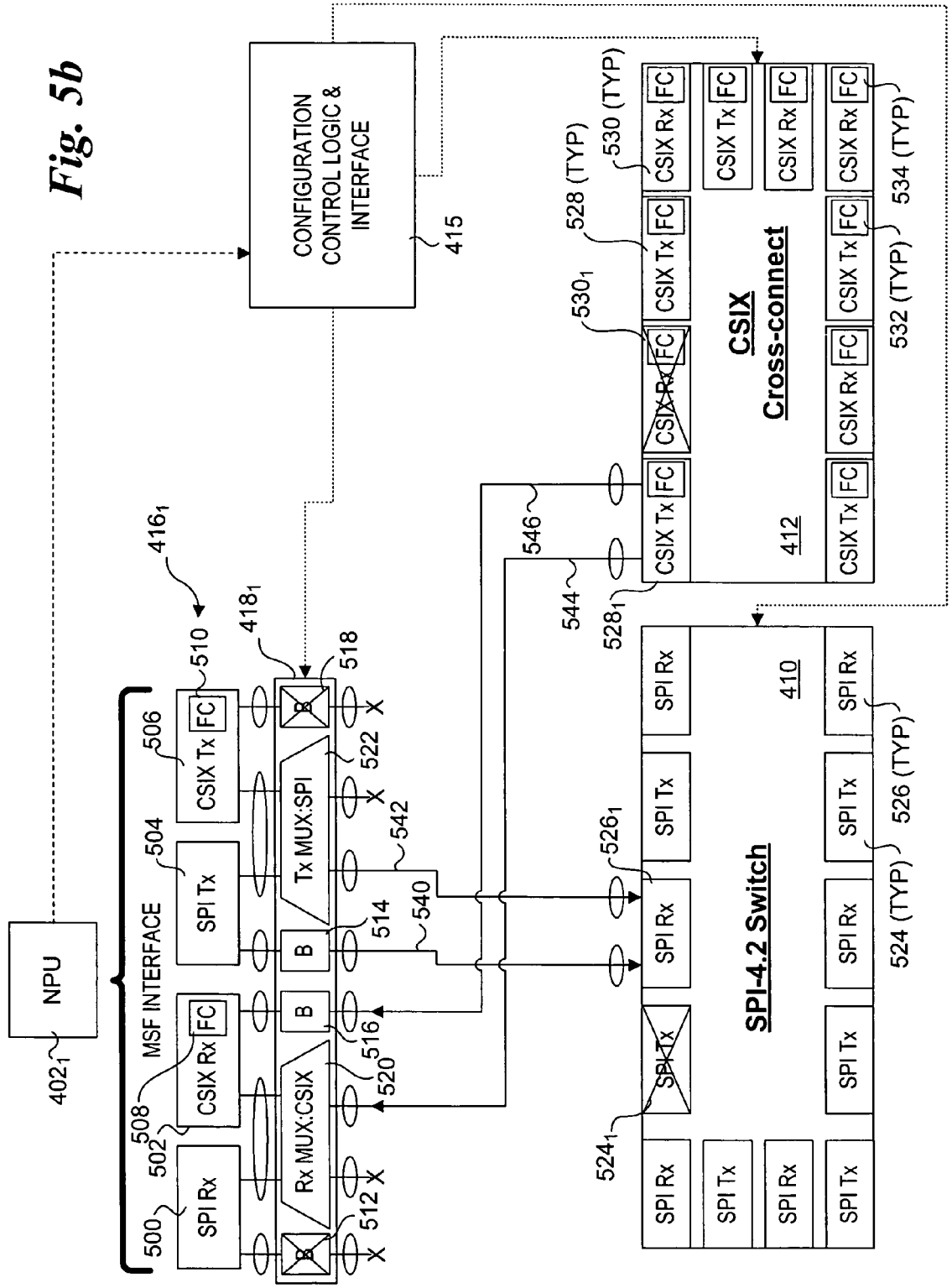
FIG. 5b shows a selectable configuration of the components of FIG. 5a, under which the NPU has a media switch fabric (MSF) interface configured as a SPI-based transmit interface and a CSIX-based receive interface.
Figure 5C:
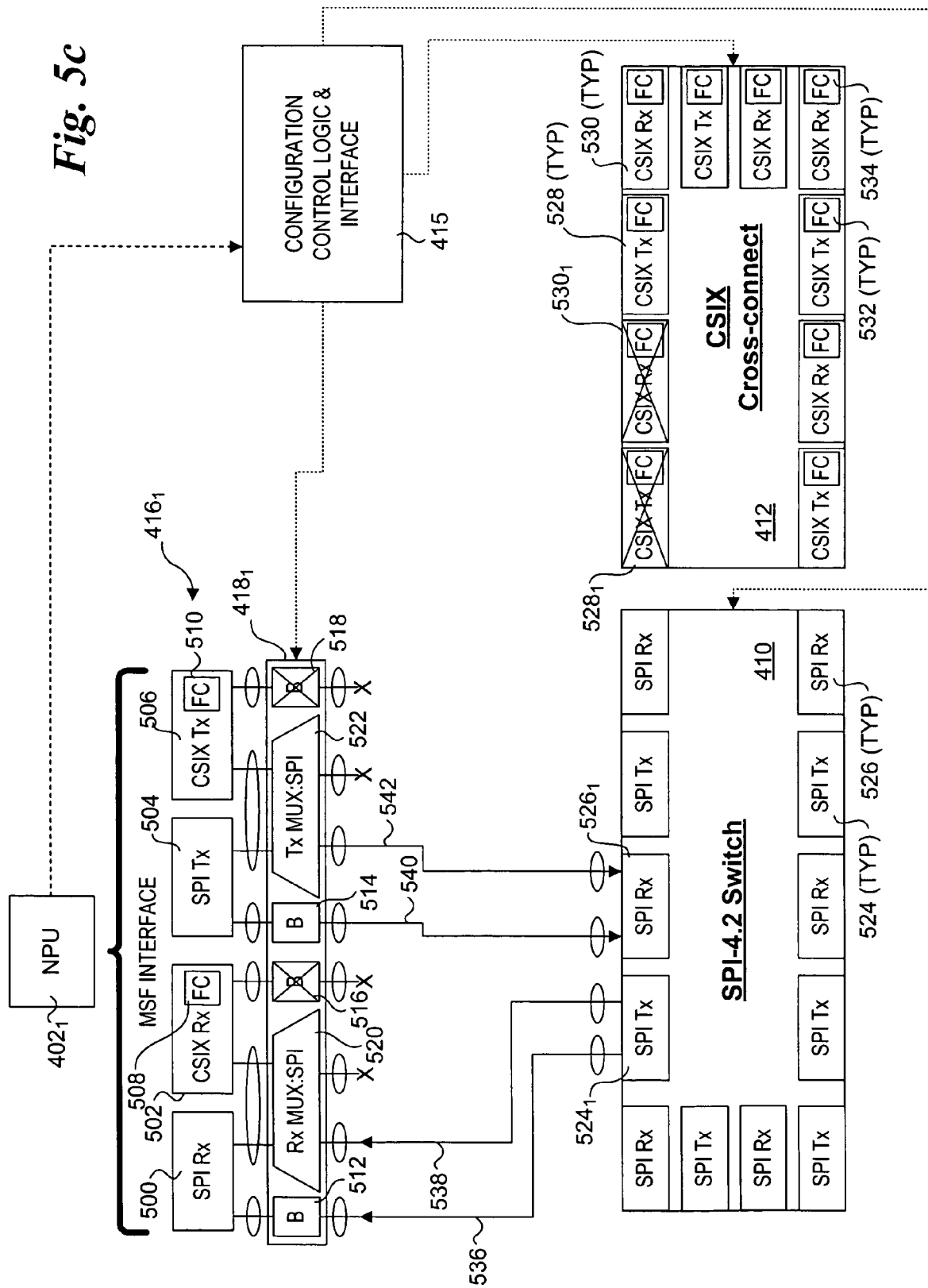
FIG. 5c shows a selectable configuration of the components of FIG. 5a, under which the NPU MSF interface is configured as a SPI-based transmit interface and a SPI-based receive interface.

Details of the foregoing interfaces as employed in FIG. 4 are illustrated in FIGS. 5a-5c. Each MSF interface 416 includes sets of signal lines that are logically partitioned into four groups: SPI receive signals 500, CSIX receive signals 502, SPI transmit signals 504, and CSIX transmit signals 506. SPI receive signals 500 and CSIX receive signals 502 collectively comprise the MSF receive interface, while SPI transmit signals 504 and CSIX transmit signals 506 collectively comprise the MSF transmit interface. In addition, the CSIX receive signals 502 include flow control (FC) receive signals 508, and the CSIX transmit signals 506 include flow control transmit signals 510. As discussed above, the flow control interface (which includes flow control receive and transmit signals 508 and 510) is considered a separate interface from the SFM receive and transmit interfaces. However, since the flow control interface signals work in cooperation with the CSIX receive and transmit interfaces, they are shown in FIGS. 5a-c to be logically groups with CSIX receive and transmit signals for simplicity and clarity. It will be understood that the CSIX flow control receive and transmit signals may be routed separately from the CSIX receive and transmit signals, as described in further detail below.

The reconfigurable CSIX interconnect/SPI switch 414 provides a respective set of buffers and multiplexers $418_{1-n}$ that interface with MSF interfaces $416_{1-n}$ for each of NPU's $402_{1-n}$. As shown in FIG. 5a, each set of buffers and multiplexers 412 includes a pair of SPI receive and transmit buffers 512 and 514, a pair of CSIX receive and transmit buffers 516 and 518, a receive multiplexer 520, and a transmit multiplexer 522.

As discussed above, the receive and transmit interfaces of the MSF interface for Intel® IXP28xx processors may be configured to operate as either an SPI-4.2 interface or a CSIX-L1 interface. Furthermore, the configuration for each of the receive and transmit interfaces may be switched between SPI-4.2 and CSIX-L1 interfaces "on the fly" (e.g., dynamically) to support mixed-mode operations. In view of these capabilities, the MSF interface of the Intel® IXP28xx processors employs four sets of signal lines for each of the receive and transmit interfaces. These sets include 1) SPI-4.2 only signals; 2) CSIX only signals; 3) CSIX flow control signals; and 4) shared signals that are selectively employed as SPI-4.2 signals or CSIX signals.

The purpose of receive multiplexer 520 is to multiplex the shared portion of SPI-4.2 receive signals 500 or CSIX receive signals 502 to an appropriate one of SPI-4.2 switch 410 or CSIX cross-connect 412 in view of configuration control signals provided by configuration control logic and interface 415. Similarly, the purpose of transmit multiplexer 522 is to multiplex the shared portion of SPI-4.2 transmit signals 504 or CSIX transmit signals 506 to an appropriate one of SPI-4.2 switch 410 or CSIX cross-connect 412 in view of configuration control signals provided by configuration control logic and interface 415.

SPI-4.2 switch 410 includes multiple SPI-4.2 transmit interfaces 524 and SPI-4.2 receive interfaces 526. In the configuration shown in FIG. 5a, an SPI-4.2 transmit interface $524_1$ is communicatively-coupled to transmit SPI-4.2 signals that are received as SPI receive signals 500 via buffer 512 and receive multiplexer 520, while an SPI receive interface $526_1$ is communicatively-coupled to receive SPI transmit signals 504 via buffer 514 and transmit multiplexer 522.

CSIX cross-connect 412 includes multiple CSIX transmit ports 528 and multiple CSIX receive ports 530. For simplicity and clarity, each of CSIX transmit ports 528 is shown to include a CSIX flow control transmit signal port 532, while each of CSX receive ports 530 is shown to include a CSIX flow control receive signal port 534. As discussed above, the CSIX flow control signals are considered as separate from the CSIX transmit and receive signals for routing purposes, as described below in further detail with reference to FIGS. 8a-c.

The various transmit and receive buffers and multiplexers for each set of buffers and multiplexers 412 are coupled to the SPI-4.2 transmit interfaces 524 and SPI-4.2 receive interfaces 526 and the CSIX transmit ports 528 and multiple CSIX receive ports 530 via respective sets of signal lines, shown as single signal lines for clarity and simplicity in the figures herein (the ellipses are used to indicate each depicted signal line includes multiple signal lines). Collectively, these sets of signal lines are referred to as the signal interconnect. For simplicity, only the sets of signal lines that are employed for interfacing with a single MSF interface are shown in FIGS. 5a-5d, while the complete signal interconnect is shown in FIG. 4. For example, the signal line sets connecting SPI-4.2 switch 410 to buffers and multiplexers 412 include signal line sets 536, 538, 540, and 542.

In the configuration shown in FIG. 5a, a CSIX transmit port $528_1$, is communicatively-coupled via signal line sets 544 and 546 to pass transmit CSIX transmit signals provided to CSIX cross-connect 412 to be received as CSIX receive signals 502 via buffer 516 and receive multiplexer 520, while a CSIX receive port $530_1$ is communicatively-coupled via signal line sets 548 and 550 to receive CSIX transmit signals 506 via buffer 518 and transmit multiplexer 522.

As shown in FIG. 4, each of the transmit, receive, and flow control signals for each MSF interface $416_1$ is connected to corresponding interfaces for each of SPI-4.2 switch 410 and CSIX cross-connect 412. This is to show the possible signal routing paths. In practice, some of the signal paths will be blocked (at either a given point in time or over an extended use), as shown in FIGS. 5b-d.

For example, under the configuration illustrated in FIG. 5b, the receive portion of MSF interface $416_1$ is selected to employ CSIX receive signals 502, while the transmit portion of the MSF interface is selected to employ SPI transmit signals 504. Accordingly, buffers 516 and 514 are configured to perform a signal pass-through function, while buffers 512 and 518 are blocked. The receive multiplexer 520 is configured to pass through the shared portion of CSIX receive signals 502 received from CSIX transmit port $528_1$ on CSIX cross-connect 412. The transmit multiplexer 522 is configured to pass through the shared portion of SPI transmit signals 504, thus coupling these signals to be received by SPI receive interface $526_1$ on SPI-4.2 switch 410.

Under the configuration illustrated in FIG. 5c, the receive portion of MSF interface $416_1$ is selected to employ SPI receive signals 500, while the transmit portion of the MSF interface is selected to employ SPI transmit signals 504. Accordingly, buffers 512 and 514 are configured to perform a signal pass-through function, while buffers 516 and 518 are blocked. The receive multiplexer 520 is configured to pass through the shared portion of SPI receive signals 500 received from SPI transmit interface $524_1$ on SPI-4.2 switch 410. The transmit multiplexer 522 is configured to pass through the shared portion of SPI transmit signals 504, thus coupling these signals to be received by SPI receive interface $526_1$ on SPI-4.2 switch 410.

Figure 5D:
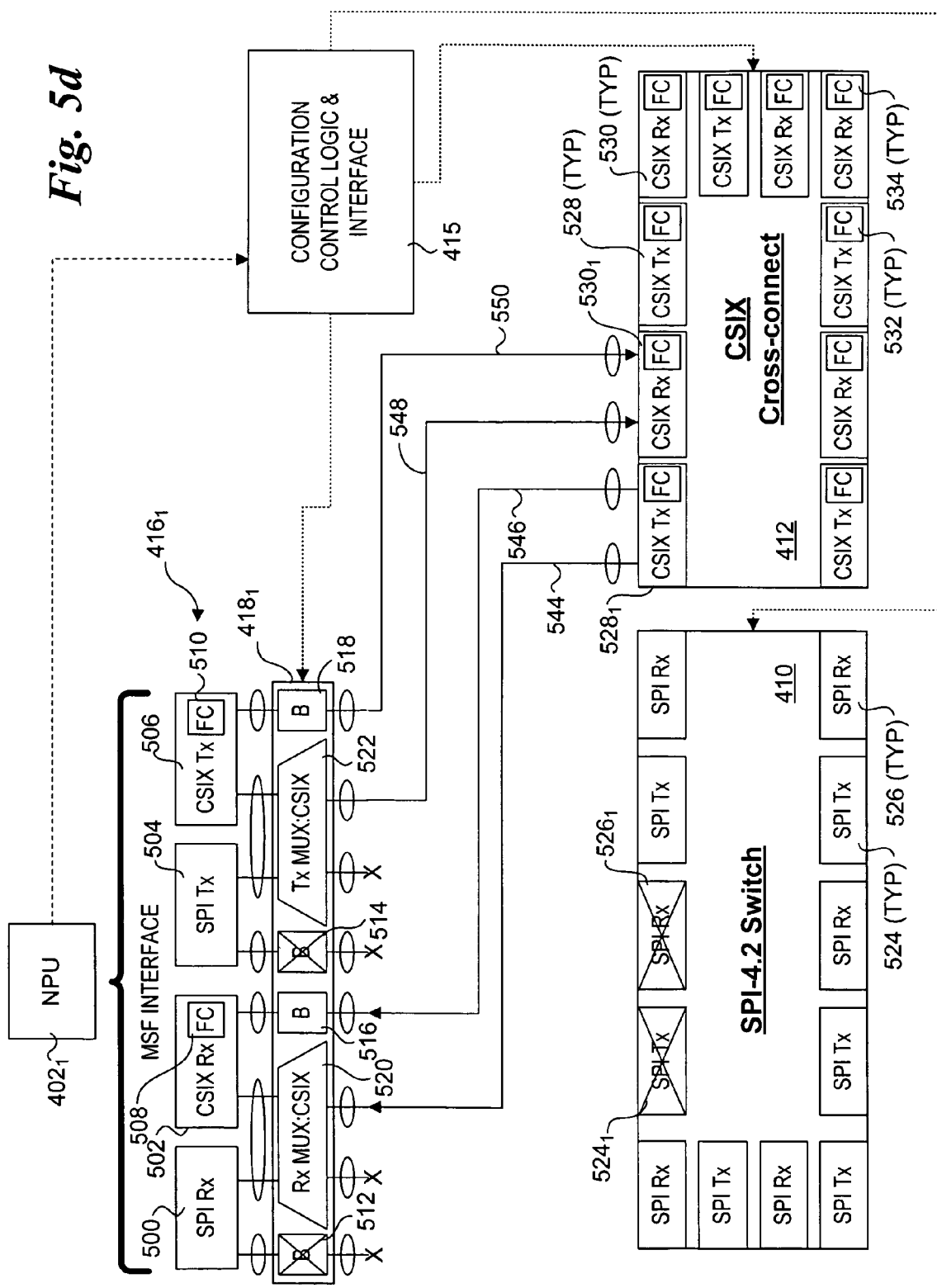
FIG. 5d shows a selectable configuration of the components of FIG. 5a, under which the NPU MSF interface is configured as a CSIX-based transmit interface and a CSIX-based receive interface.

Under the configuration illustrated in FIG. 5d, the receive portion of MSF interface $416_1$ is selected to employ CSIX receive signals 502, while the transmit portion of the MSF interface is selected to employ CSIX transmit signals 506. Accordingly, buffers 516 and 518 are configured to perform a signal pass-through function, while buffers 512 and 514 are blocked. The receive multiplexer 520 is configured to pass through the shared portion of CSIX receive signals 502 received from CSIX transmit port $528_1$ on CSIX cross-connect 412. The transmit multiplexer 522 is configured to pass through the shared portion of CSIX transmit signals 506, thus coupling these signals to be received by CSIX receive port $530_1$ on CSIX cross-connect 412.

The SPI specifications, including the SPI-4.2 specification (current version System Packet Interface Level 4 Phase 2

Revision 1 (OIF-SPI-4-02.1) Oct. 15, 2003), are defined by the Optical Internetworking Forum (OIF). The System Packet Interface is defined between a Physical Layer (PHY) device(s) and the rest of the SONET/SDH system (e.g., between the SONET/SDH Framer and the Link Layer). This interface separates the synchronous PHY layers from the asynchronous packet-based processing performed by the higher levels. As such, the SPI supports transmit and receive data transfers at clock rates independent of the actual line bit rate.

Figure 6:
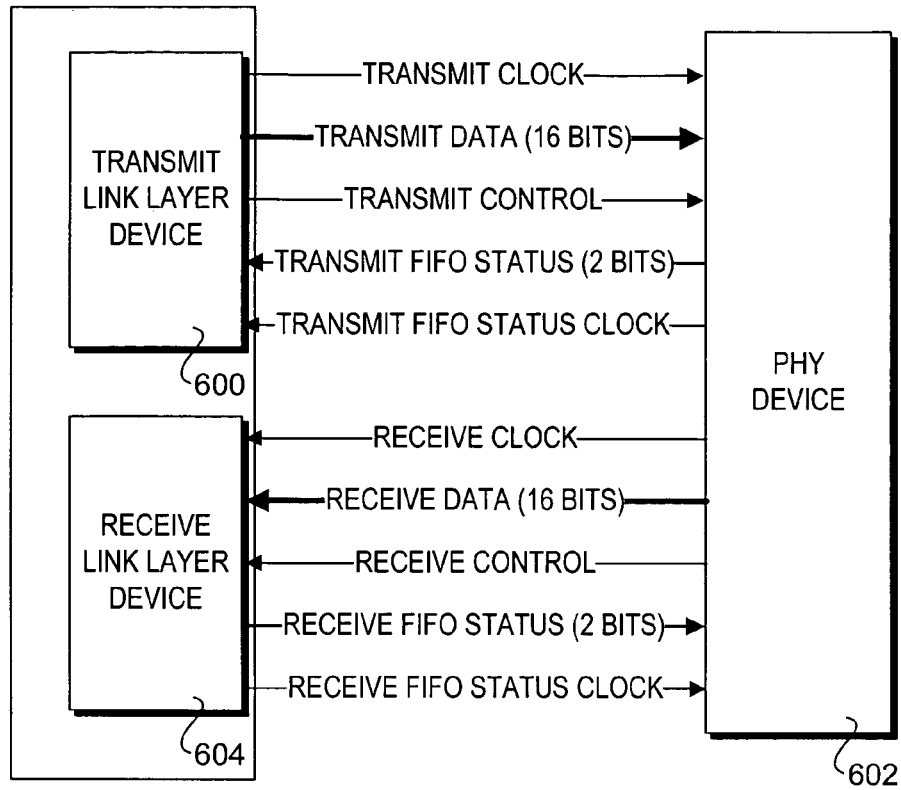
FIG. 6 is a schematic block diagram illustrating the signals used under the SPI-4.2 media interface.

SPI-4 is an interface for packet and cell transfer between a PHY device and Link Layer device. It supports OC-192/STM-64 line rates (e.g. 10 Gigabits per second). Under the SPI-4.2 specification, the transmit and receive interfaces are completely separate and independent. This is depicted in FIG. 6, wherein SPI transmit signals are passed between a transmit link layer device 600 and a PHY device 602, while SPI Receive signals are passed between PHY device 602 and a receive link layer device 604. (It is noted that transmit link layer device 600 and receive link layer device 604 may comprises separate devices, or the same device.)

Each of the transmit and receive data paths are 16-bits wide, as depicted by transmit data signals and the receive data signals in FIG. 6. The transmit and receive data path signal employ low voltage differential signaling (LVDS) per the IEEE 1596.3-1996, and ANSI/TIA/EIA-644-1995 specifications. Source-synchronous double-edge clocking is employed by each of the transmit clock and receive clock signals. A transmit control and receive control signal is also provided for each of the transmit and receive directions. The SPI-4.2 specification also provides a Transmit/Receive FIFO (first-in first-out) Status interface. This is supported by 2-bit transmit and receive FIFO status signals and transmit and receive FIFO status source-synchronous clock signals.

Figure 7:
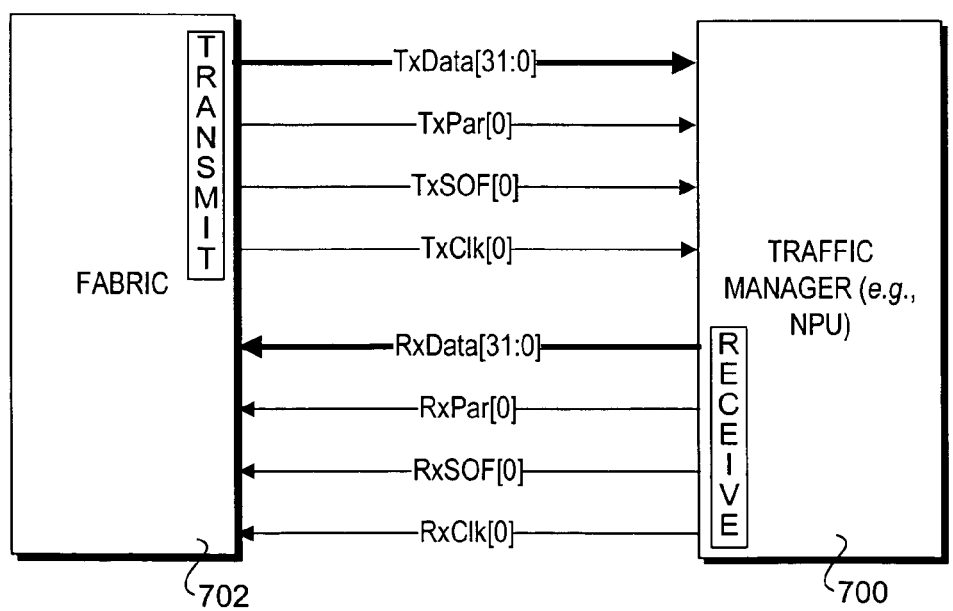
FIG. 7 is a schematic block diagram illustrating the signals used under the CSIX-L1 interface.

CSIX-L1 is the Common Switch Interface, which is defined by the Network Processor Forum (NPF). The current specification is CSIX-L1:Common Switch Interface Specification-L1 Rev 1.0 Aug. 5, 2000 (available at http//www.np-forum.org and www.csix.org). It defines a physical interface for transferring information between a traffic manager 700 and a switching fabric 702, as shown in FIG. 7. The interface where data flows from traffic manager 700 to switch fabric 702 is labeled the receive interface, and the interface where data flows from the switch fabric to the traffic manager is labeled the transmit interface. In the examples depicted in FIG. 4 and FIGS. 5a-d, the NPUs perform the traffic manager operations.

A CSIX Frame (Cframe) is the information unit transferred between traffic managers and a CSIX fabric. A CFrame consists of a base header and an optional extension header, a variable length payload, and a 16-bit vertical parity field. CFrames are transmitted across transmit and receive data paths that can be n×32-bits wide, where n=1, 2, 3, or 4. There are three categories of CFrames, including data, control, and idle.

The switch fabric 702 presents data to traffic manager 700 via the vector TxData, which can be 32, 64, 96 or 128 bits wide. As shown in FIG. 7, the TxData vector is 32 bits wide (e.g., TxData[31:0]). The switch fabric presents data parity to the traffic manager via the vector TxPar[m . . . 0] (horizontal parity). The size of the TxPar vector is determined by the application and may be 1, 2, 3, or 4 bits wide (e.g., TxPar[0] for a 1-bit vector).

The switch fabric 702 provides data transfer/synchronization clock(s) to traffic manager 700 for synchronizing transfers on TxData, as depicted by the TxClk[0] signal in FIG. 7. There is one TxClk signal required for a group of at least 32 bits of TxData.

The switch fabric 702 asserts a TxSOF signal to indicate the start of a CFrame. The number of TxSOF signals required is determined by the application and may be 1, 2, 3, or 4, wherein one TxSOF signal is required for each TxClk group (e.g., TxSOF[0] for a 32-bit wide TxData vector).

The traffic manager 700 presents data to switch fabric 702 via the vector RxData. The size of the RxData vector is determined by the application and may be 32, 64, 96, or 128 bits. In the example of FIG. 7, RxData is 32-bits wide, as depicted by RxData[31:0]. The traffic manager 700 presents data parity to switch fabric 702 via the vector RxPar[m . . . 0] (horizontal parity). The size of the RxPar vector is determined by the application and may be 1, 2, 3, or 4 bits wide (e.g., RxPar[0] for a 1-bit vector).

The traffic manager 700 provides data transfer/synchronization clock(s) to switch fabric 702 for synchronizing transfers on RxData, as depicted by the RxClk[0] signal in FIG. 7. There is one RxClk signal required for a group of at least 32 bits of RxData.

The traffic manager 700 asserts an RxSOF signal to indicate the start of a CFrame. The number of RxSOF signals required is determined by the application and may be 1, 2, 3, or 4, wherein one RxSOF signal is required for each TxClk group (e.g., RxSOF[0] for a 32-bit wide RxData vector).

There are two types of CSIX-L1 flow control: Link Level and Virtual Output Queue (VOQ). Every CFrame base header contains a Ready field, which contains two link level flow control bits: one for Flow Control traffic and one for Data traffic. The Virtual Output Queue Flow Control is carried in Flow Control CFrames.

The Intel® IXP28xx NPU MSF Flow Control Bus passes CSIX-L1 Flow Control CFrames between two network processors or between a switch fabric and a single network processor. The bus is implemented as two independent unidirectional buses. It uses LVDS signaling with the same clocking rate as the MSF receive and transmit channels, and has a 4-bit data bus—yielding an available bandwidth equal to 25 percent of the receive and transmit channels.

Figure 8C:
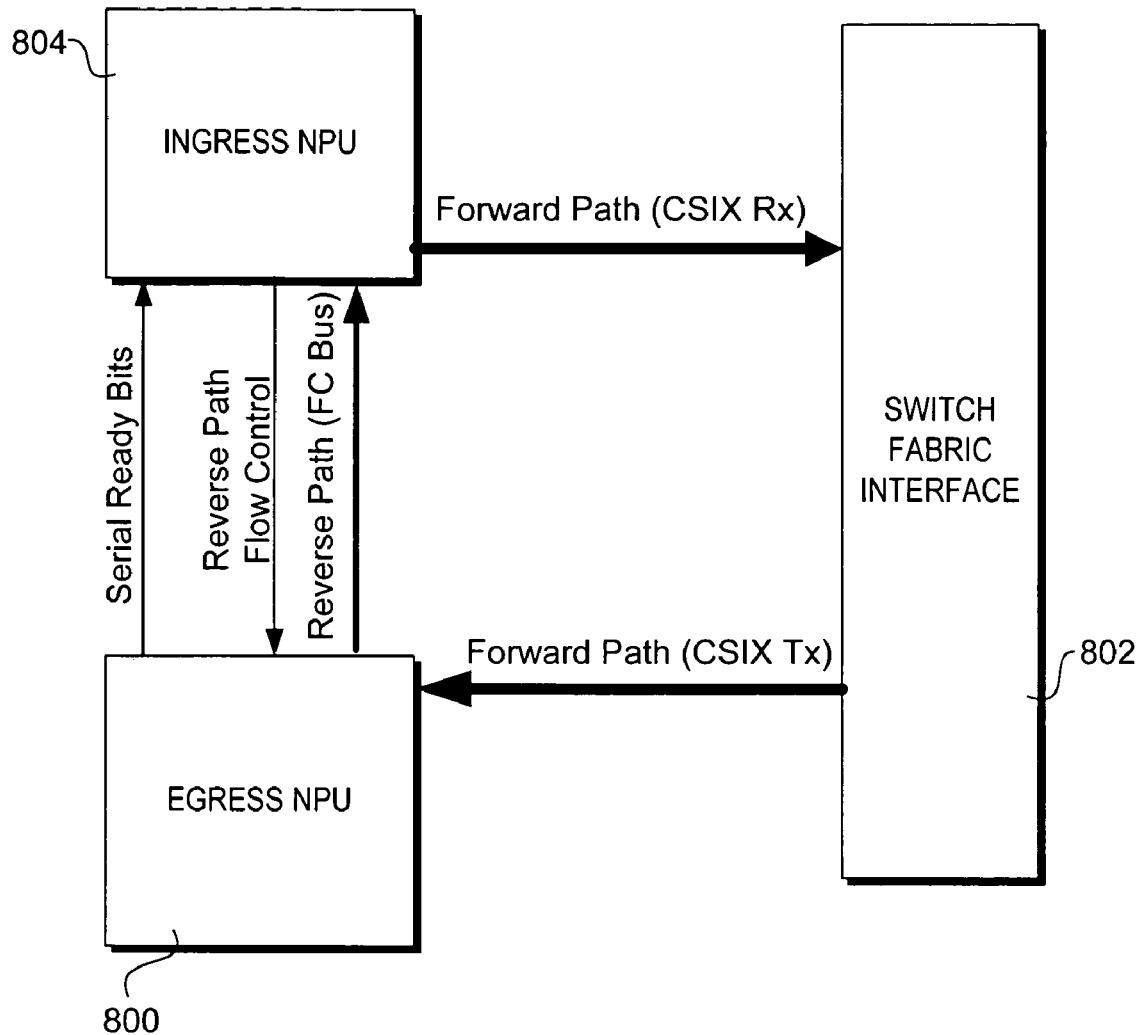
FIG. 8c is a schematic diagram illustrating a dual chip, full duplex mode for employing flow control using an ingress and egress NPU under the CSIX-L1 interface.

The Flow Control Bus can be configured in one of three modes: 1) Simplex Mode (as shown in FIG. 8a), for applications where the Fabric Interface uses the transmit (forward path) and receive (reverse path) channels to pass flow control CFrames; 2) Hybrid Simplex Mode (as shown in FIG. 8b), which adds reverse path flow control to the Simplex Mode; and 3) Dual Chip, Full Duplex Mode (as shown in FIG. 8c), for applications where the Fabric Interface is designed to use the Flow Control Bus to pass flow control CFrames. (It is noted that the SPI-4.2 interfaces may also be configured in the Simplex, Hybrid Simplex, and Full Duplex Modes, but using SPI-4.2 signals in place of CSIX signals.)

When the IXP28xx NPU is configured in Simplex Mode, the Flow Control Bus signals are connected directly to the Switch Fabric, as depicted by Forward Path (Flow Control Tx) and Reverse Path (Flow Control Rx) signals in FIG. 8a. The Egress NPU 800 sends flow control CFrames (via the Flow Control Rx signal) directly to the Switch Fabric (via switch fabric interface 802), and the Switch Fabric sends flow control CFrames directly to the Ingress NPU 804 (via switch fabric interface 802 using the Flow Control Tx signal).

In the CSIX Hybrid Simplex mode (FIG. 8b), virtual output queue flow control (or other information) uses a DDR (double data-rate) LVDS reverse bus similar to the Simplex mode. The bus that is used for flow control (back to the switch fabric) is also a DDR LVDS bus, but asynchronous.

When the IXP28xx NPU is configured in Dual Chip, Full Duplex Mode (FIG. 8c), the Egress NPU 800 automatically forwards CFrames received from the Switch Fabric (via switch fabric interface 802) across the Flow Control Bus 804 to the Ingress NPU 804. Additionally, Egress NPU 800 sends incoming and outgoing Link Level flow control information (Serial Ready Bits) across the Flow Control Serial Bus to the Ingress NPU 804.

Figure 9:
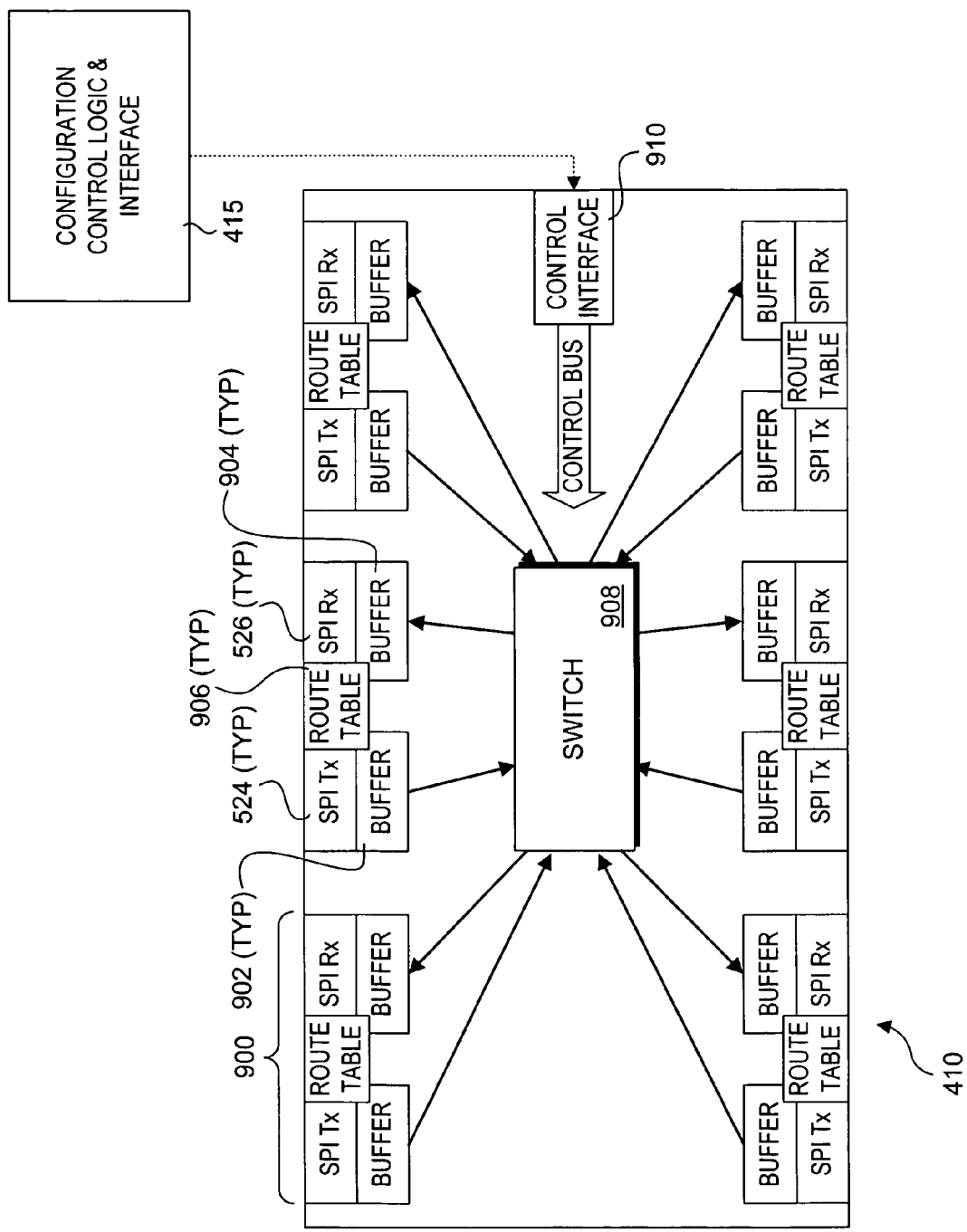
FIG. 9 is a schematic diagram illustrating an architecture corresponding to one embodiment of an SPI-4-based switch.

Architecture details of one embodiment of SPI-4.2 switch 410, which comprises a PivotPoint FM1010 six-interface SPI-4.2 Interconnect chip manufactured by Fulcrum Microsystems, Calabasas Hills, Calif., are shown in FIG. 9. The SPI-4.2 switch includes multiple SPI-4.2 I/O interfaces 900 disposed about the periphery of the switch. Each SPI-4.2 I/O interface 900 includes an SPI transmit interface 524 with buffer 902, an SPI receive interface 526 with buffer 904, and a route table 906. The buffers 904 and 906 of each SPI-4.2 I/O interface 900 are connected to a switch 908. Switch 908 essentially functions as a multiplexer that enables signals from any SPI-4.2 I/O interface to be selectively sent to and received from any other SPI-4.2 I/O interface. Furthermore, the transmit and receive halves of the SPI-4.2 I/O interfaces may operate independently.

CSIX cross-connect 412 operates as a dynamically reconfigurable interconnect. The I/O ports (e.g., signal lines) for the cross-connect are partitioned into in groups of m, wherein m equals the number of ports that may be cross-routed. For example, a port in a given group may route signals to any other port in that group. Internally, the cross-connect functions as an m×m multiplexer. For illustrative purpose, each of CSIX transmit ports 528 and receive ports 530 represent a sets of corresponding set of I/O ports. Depending on the particular implementation, each of selected I/O ports on CSIX cross-connect 412 may perform buffering and/or other signal handling operations. In one embodiment, CSIX cross-connect 412 is enabled to interface with LVDS signals.

In general, reconfigurable CSIX interconnect/SPI switch 414 can be implemented as a single component, a sub-assembly, or may be integrated into the hosting line card. For example, in one embodiment, reconfigurable CSIX interconnect/SPI switch 414 is implemented as a daughter board that is coupled to a line card printed circuit board (PCB). In this embodiment, the daughter card includes integrated circuit (IC) chips for performing the various functions and operations depicted in Figures herein, including the functions and operations depicted by buffers 512, 514, 516 and 518, receive multiplexers 520, transmit multiplexers 522, SPI-4.2 switch 410, and CSIX cross-connect 412. In one embodiment, SPI-4.2 switch 410 comprises the aforementioned PivotPoint FM1010 six-interface SPI-4.2 Interconnect chip. In one embodiment, the functions performed by CSIX cross-connect 412 are implemented by one or more LVDS 4×4 cross-point switches (e.g., Model No. SN65LVDS125) manufactured by Texas Instruments, Dallas, Tex. The SN65LVDS125 crosspoint switch chip provided 4×4 non-blocking switching operations between any of four I/O ports for each group of I/O ports. In a similar manner to that used for the daughter board, similar chip components may be integrated directly on the line card PCB.

Depending on the implementation, buffers 512, 514, 516 and 518 may comprise separate buffers, or there equivalent buffering function may be provided by another component. For example, Intel® IXP28xx NPUs provide built-in buffering functions for its SPI-4.2 and CSIX-L1 interface signals. Accordingly, the signals from an Intel® IXP28xx NPU may be connected directly to SPI-4.2 switch 410 in some implementations. Similarly, buffering may be provided by the media-based switch and/or the fabric-based cross-connect that is employed by the implementation.

The reconfigurable CSIX interconnect/SPI switch 414 may also be implemented as a substrate with appropriately-configured circuit dies and elements embedded therein or attached thereto. For example, the logic circuitry for implementing each of SPI-4.2 switch 410 and CSIX cross-connect 412 may be integrated onto the substrate using circuit dies or the like using well-known techniques. Similarly, circuitry for implementing buffers 512, 514, 516 and 518 (if necessary), receive multiplexers 520, and transmit multiplexers 522 may be integrated onto the substrate.

As discussed above, some NPUs share signal lines for the SPI-4.2 and CSIX interfaces. These may include both control signal and data signal lines. In particular, the Intel® IXP28xx NPUs share the data signal lines for the SPI-4.2 and CSIX-L1 interfaces, meaning the same set of signal lines are used for SPI-4.2 RDAT[15:0] (receive data) and CSIX TxData[15:0] using a pair of LDVS signals for each data signal (for a total of 32 signal lines). Similarly, the same 32 LDVS signal lines are used for the SPI-4.2 TDAT[15:0] (transmit data) and CSIX RxData[15:0] signals.

From a signal routing standpoint, these signals are routed to one of SPI4.2 switch 410 or CSIX cross-connect 412 using receive multiplexer 520 and transmit multiplexer 522, which are configured by configuration control logic and interface 415. At the NPU side, the signal lines may be programmatically configured to support SPI-4.2 and CSIX interface functions (one at a time). From a control standpoint, the typical flow would be for the NPU to switch to a particular mode (either SPI-4.2 or CSIX), while sending a configuration bit or similar data to configuration control logic and interface 415 to inform the configuration control logic what mode the NPU is using and thus which way to configure the receive and transmit multiplexers 520 and 522.

Also as discussed above, the CSIX-L1 interface transmits and receives data via n×32 bit data paths, where n=1, 2, 3, or 4. As a result, there needs to be a mechanism for converting the 16-bit CSIX signal data paths supported by the Intel® IXP28xx NPUs to an n×32 bit data path. In one embodiment, a 32-bit data path is used to interface with the CSIX-based switch fabric. Typically, a field-programmable gate array (FPGA) or application-specific integrated circuit (ASIC) may be used to perform the conversion between the 16-bit and 32-bit interfaces using techniques well-known in the signal processing arts.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the drawings. Rather, the scope of the invention is to be determined entirely by the following claims, which are to be construed in accordance with established doctrines of claim interpretation.

What is claimed is:

1. A network line card, comprising:
   a media interface;
   a switch fabric interface;
   a plurality of network processor units (NPUs), each NPU within the plurality of NPUs including a media switch fabric (MSF) interface that may configured to support media-based transmit and receive interfaces and switch fabric-based transmit and receive interfaces;
   a media-based switch including a plurality of media-based transmit and receive interfaces,
   a cross-connect having a plurality of groups of input/output (I/O ports), the cross connect enabling a signal for a given I/O port in a group within the plurality of groups to be selectively routed to another I/O port in that group; and
   a mechanism to selectively couple, for each NPU MSF interface, media-based transmit and receive signals to the media-based switch and switch fabric-based transmit and receive signals to the cross-connect,
   wherein a given NPU is enabled to communicate with another NPU and the media interface via media transmit and receive signals routed through the media-based switch, and each NPU is enabled to communicate with the switch fabric interface via signals routed through the cross-connect.

2. The network line card of claim 1, wherein the media-based interface comprises a System Packet Interface Level 4 phase 2 (SPI-4.2) interface, and the media-based switch comprises an SPI-4.2 switch.

3. The network line card of claim 1, wherein the switch fabric-based interface comprises a Common Switch Interface Level 1 (CSIX-L1) interface.

4. The network line card of claim 1, wherein the plurality of NPUs comprise at least four NPUs.

5. The network line card of claim 1, further comprising:
   a NPU having at least one of a media-based interface and a switch fabric interface; the media-based interface selectively coupleable to the media-based switch; the switch fabric interface selectively coupleable to the cross-connect.

6. A method, comprising:
   enabling a first plurality of NPUs on a network line card each to selectively send media-based signals to other members of the first plurality of NPUs and a media interface; and
   enabling a second plurality of NPUs on the network line card each to selectively send switch fabric-based signals to other members of the second plurality of NPUs and a switch fabric interface,
   wherein at least two NPUs are members of both the first and second plurality of NPUs and are enabled to selectively send and receive media-based signals and switch fabric-based signals,
   wherein each of the first and second plurality of NPUs supports mixed mode operations under which a given NPU can support a media-based interface and a switch fabric-based interface, the method further comprising
   enabling signals for the media-based interface of each NPU to be selectively coupled to a media-based switch disposed on the network line card and communicatively coupled to the media interface, the media-based switch enabling media-based signals transmitted from a first NPU to be selectively routed to one of a second NPU or the media interface; and
   enabling signals for the switch fabric-based interface of each NPU to be selectively coupled to a reconfigurable switch fabric-based cross-connect disposed on the network line card and communicatively coupled to the switch fabric, the reconfigurable switch fabric-based cross-connect enabling switch fabric-based signals transmitted from a first NPU to be selectively received by one of a second NPU or the switch fabric interface.

7. The method of claim 6, wherein the media interface comprises a System Packet Interface Level 2 phase 4 (SPI-4.2) interface and the switch fabric interface comprises a Common Switch Interface Level 1 (CSIX-L1) interface.

* * * * *